United States Patent [19]

Wakabayashi

[11] 4,377,663

[45] Mar. 22, 1983

[54] COMPOSITION

[75] Inventor: Hiroshi Wakabayashi, Kobe, Japan

[73] Assignee: Kanegafuchi Kagaku Kogyo Kabushiki Kaisha, Osaka, Japan

[21] Appl. No.: 305,326

[22] Filed: Sep. 24, 1981

[30] Foreign Application Priority Data

Oct. 3, 1980 [JP] Japan ............................... 55-139085

[51] Int. Cl.³ .......................... C09D 3/66; C09D 3/58; C09D 3/74; C09D 5/02
[52] U.S. Cl. ....................................... 525/64; 525/65; 525/80; 525/285; 525/290
[58] Field of Search ................... 525/64, 65, 285, 290, 525/80

[56] References Cited

U.S. PATENT DOCUMENTS

| | | | |
|---|---|---|---|
| 2,608,550 | 8/1952 | Rowland et al. | 525/285 |
| 3,941,757 | 3/1976 | Wakabayashi et al. | 525/290 |
| 3,962,198 | 6/1976 | Wada et al. | 525/290 |
| 3,984,381 | 10/1976 | Tsuchiya et al. | 525/290 |
| 4,079,102 | 3/1978 | Wagner et al. | 525/285 |

FOREIGN PATENT DOCUMENTS 55-125116  9/1980  Japan ................................. 525/290

Primary Examiner—Ronald W. Griffin
Attorney, Agent, or Firm—Moonray Kojima

[57] ABSTRACT

A composition comprising a homogeneous blend of 95 to 5 parts by weight of an oxidation-curable type water-soluble resin and 5 to 95 parts by weight of a vinyl polymer obtained by polymerizing a vinyl monomer or monomers in the presence of a neutralized, water-soluble product of an adduct between a substantially amorphous polymer obtained by ring-opening polymerization of dicyclopentadiene and maleic acid or maleic anhydride. The composition is useful as a coating material, and has advantageous properties of both emulsions and water-soluble resins, such as good drying, good water resistance, good solvent resistance, good luster and good corrosion resistance.

9 Claims, No Drawings

COMPOSITION

BACKGROUND OF THE INVENTION

1. Field of the Invention

This invention relates to a composition comprising a homogeneous mixture or blend of an oxidation-curable type water-soluble resin; and a vinyl type polymer obtained by polymerizing a vinyl monomer or monomers in the presence of a neutralized, water-soluble product of an adduct between an amorphous polymer obtained by ring-opening polymerization of dicyclopentadiene and maleic acid or maleic anhydride.

2. Description of the Prior Art

As is well known, aqueous coating materials are noted as being one type of environmental pollution free or resource saving type of coating material. Synthetic resin emulsions are in wide use as resins for such aqueous coating material. However, such synthetic resin emulsion, of which vinyl acetate type or acrylic type emulsions are typical, are deficient for use in such coatings. Although these emulsions show excellent drying properties, their coating films undergo deterioration of water resistance after coating and drying, because of the use of an emulsifier or protective colloid upon polymerization. In addition, these emulsions are liable to form porous coating films because of their film forming mechanism, and the resulting film does not have sufficient luster and adhesiveness to be commercially useful.

The inventors have disclosed in Japanese patent application Ser. No. 114018/79, an invention relating to a vinyl type polymer emulsion, obtained by emulsion polymerization of a vinyl monomer or monomers in the presence of a netralized, water-soluble product of an adduct between an amorphous polymer obtained by ring-opening polymerization of dicyclopentadiene and having chain-like and cyclic carbon-to-carbon unsaturated double bonds within the monomer unit (hereinafter referred to as DCPD polymer) and maleic acid or maleic anhydride (maleinized DCPD polymer). This vinyl type polymer emulsion undergoes rapid oxidation curing and is excellent in water resistance and solvent resistance. However, it does not show satisfactory corrosion resistance and coating film luster due to its property of forming a porous surface which is characteristic of a water dispersible resin.

A possible alternative for removing such defects of a water-dispersible resin, may be mixing or a polymer emulsion with a general water soluble resin, which shows good luster, good adhesiveness and good pigment dispersing properties. However, a large amount of water soluble resin is necessary for removing the defects of polymer emulsions. The resulting coating film always has insufficient drying properties and insufficient solvent resistance, although the polymer emulsion itself may provide good drying properties and good solvent resistance.

SUMMARY OF THE INVENTION

Accordingly, an object of the invention is to eliminate or substantially remove the aforementioned and other defects, disadvantages and deficiencies of the prior art.

Another object is to remove the aforementioned and other general defects attributable to water dispersible resins, while maintaining the excellent properties of vinyl type polymer emulsion obtained by using the aforesaid netralized, water soluble product of maleinized DCPD polymer as an emulsifier.

The foregoing and other objects are attained by the invention which encompasses a composition comprising a homogeneous mixture or blend of an oxidation curable type water soluble resin and a vinyl type polymer emulsion obtained by using a neutralized, water soluble product of maleinized DCPD polymer. The ratio of the vinyl type polymer to the oxidation curable type water soluble resin is preferably within the range of 5:95 to 95:5; and more preferably not more than 80:20. Advantageously, the inventive composition has the advantageous properties of both the vinyl polymer emulsion and the oxidation curable water soluble resin, that is, good drying properties, good water resistance, good solvent resistance, good luster and good corrosion resistance. It does not show any of the aforementioned defects.

DETAILED DESCRIPTION OF PREFERRED EMBODIMENTS

The present invention encompasses a novel composition comprising a homogeneous blend or mixture of
(a) a vinyl type polymer obtained by polymerizing a vinyl monomer or monomers, in the presence of a neutralized, water-soluble product of an adduct between a substantially amorphous polymer obtained by ring-opening polymerization of dicyclopentadiene represented by the following chemical structural formula:

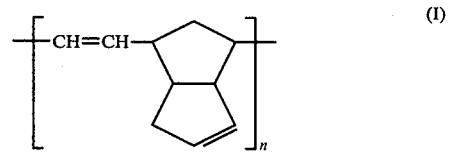

and maleic acid or maleic anhydride; and
(b) an oxidation-curable type water soluble resin, with the proportion of (a) to (b) being within the range of from 5:95 to 95:5, in terms of solid content.

Component (a), to be used in this invention, can be synthesized according to a process described in Japanese patent application Ser. No. 114018/79. The average molecular weight of maleinized DCPD resin, which can be measured by, for example, an osmotic pressure method, is preferably between 500 to 50,000, and more preferably between 1,000 to 10,000. As the DCPD polymer to be used in the present invention, any amorphous DCPD polymer obtained by ring-opening polymerization and represented by the foregoing formula (I) can be used, irrespective of the process or its preparation. Specific illustrative processes are described in Japanese patent application (OPI (open for public inspection)) Nos. 92000/78 and 111399/78.

The maleinizing reaction can be conducted in any ordinary manner. For example, the method can encompass adding maleic acid and/or maleic anhydride, a solvent, and wherein desired, additives to the resin, substantially replacing the atmosphere with nitrogen, and heating the mixture at 150° to 250° C. under stirring, followed by neutralization to render the product water soluble.

As a base for the neutralization, there are illustrated, for example, ammonia, amines, and hydroxides, oxides, carbonates, and bicarbonates of alkali metals. The amines may include usually employed primary, secondary, or tertiary amines and polyamines, such as diamines, triamines and tetramines. The maleinizing degree is desirably adjusted so that the acid value of the maleinized DCPD polymer becomes preferably 30 to 500, more preferably 50 to 300. In addition, maleinized DCPD polymer, partly modified with a compound having a functional group capable of reacting with the acid anhydride group, such as a compound having an amino group, a hydroxy group, an epoxy group or the like, can be also used.

As the vinyl monomer to be used in the invention, a wide variety of monomers can be illustrated as examples. It is not preferable to use those monomers with a too strong hydrophilicity, in a large amount, as is the same with general emulsion polymerization. As the vinyl monomer, there are illustrated, for example, aromatic vinyl compounds, acrylic acid esters, methacrylic acid esters, glycidyl acrylate, glycidyl acrylate derivatives, glycidyl methacrylate, glycidyl methacrylate derivatives, conjugated diene compounds, etc. The aromatic vinyl compounds may include styrene, vinyltoluene, alpha methyl styrene, divinylbenzene, etc. The acrylic and methacrylic acid esters may include those represented by the general formula

$CH_2=C(R_1)COOR_2$ wherein $R_1$ represents a hydrogen atom or a methyl group, and $R_2$ represents an alkyl group containing 1 to 30 carbon atoms; and esters between acrylic or methacrylic acid and ethylene glycol monoalkyl ether, propylene glycol monoalkyl ether or diethylene glycol monoalkyl ether (alkyl moiety containing 1 to 8 carbon atoms), such as allyl acrylate, allyl methacrylate, hydroxypropyl acrylate, hydroxyethyl methacrylate, diethylaminoethyl methacrylate, allyloxyethyl acrylate, allyloxyethyl methacrylate, etc. The conjugated diene compounds may include butadiene, pentadiene, isoprene, chloroprene, etc. These polymerizable vinyl monomers maybe used alone or in combination or two or more.

Furthermore, other water soluble or hydrophilic vinyl monomers that those above described, such as acrylic acid, methacrylic acid, itaconic acid, acrylamide, methacrylamide, N-methylacrylamide, N-methylolated acrylamide, dimethylaminoethyl methacrylate, N-methylolated methacrylamide, hydroxyethyl acrylate, vinylpyridine, vinyl acetate, vinyl chloride, vinylidene chloride, acrylonitrile, vinyl pyrrolidone, etc, can, for example, be used separately or together in small amounts.

In the present invention, polymerization of the polymerizable vinyl monomer is preferably conducted in water, in the presence of the neutralized, water soluble product of maleinized DCPD polymer, vinyl monomer, radical polymerization initiator and, where desired, water soluble or hydrophilic organic solvent, at temperatures, preferably, between 0° and 100° C. As the radical polymerization initiator, either water soluble or oil soluble ones can be effectively used. Examples of initiators may include inorganic initiators, such as ammonium persulfate, potassium persulfate, etc; and organic initiators, such as benzoyl peroxide, azobisisobutyronitrile, cumene hydroperoxide, etc. Also, water soluble or oil soluble redox initiators, actinic light, a combination of photo sensitizer and actinic light, ionizing radiations, ultrasonic waves, etc, can be effectively used. As the water soluble or hydrophilic organic solvents, there are illustrated, for example, alcoholic solvents, ether series solvents, ester serives solvents, amide series solvents and ketone series solvents.

The proportion of maleinized DCPD polymer to vinyl monomer to be used in the present invention is not particularly limited as long as it falls within a range which enables the formation of a stable emulsion. In general, however, the proportion is preferably adjusted so that the acid value of the total solid component of the resulting emulsion before neutralization, falls within the range of preferably from about 3 to about 100.

As the oxidation curable type water soluble resin (b) to be used in this invention, there are illustrated, for example, neutralized products of maleinized processed oils and maleinized synthetic oils, netralized products of maleinized polybutadiene, water soluble alkyd resins, water soluble epoxyester resins, fatty acid modified water soluble acrylic resins and the like. These oxidation curable type water soluble resins preferably possess an acid value of about 20 to about 100, and a weight average molecular weight (as measured by the GPC method) of about 800 to about 20,000. Of these resins, water soluble alkyd resins, water soluble epoxyester resins, and fatty acid modified water soluble acrylic resins are most preferred for use in the invention.

As the netralized, water soluble products of maleinized drying oils, maleinized semi-drying oils, maleinized synthetic oils and maleinized processed oils, there are illustrated, for example, those which are obtained by placing a drying oil or a semi-drying oil (e.g. linseed oil, soybean oil, tung oil, safflower oil, castor oil, etc) or a synthetic or processed oil (e.g. a boiled oil, a stand oil, an esterified oil, a styrenated oil, etc) maleic acid and/or maleic anhydride, and where desired, a solvent in a reaction vessel and, after replacing the atmosphere with nitrogen, heating the mixture, and neutralizing the resultant maleinized product to render it water soluble. As the neutralized, water soluble products of maleinized polybutadiene, there are illustrated, for example, those which are obtained by neutralizing maleinized products of 1,2-polybutadiene or 1,4-polybutadiene prepared by maleinizing in the same manner as described above. As the water soluble alkyd resins, there are illustrated, for example, those which are obtained by reacting an alcoholic material, a carboxylic acid material and a drying oil material in a well known manner and which possess an acid value of, usually, not more than 200, preferably 20 to 100, and a weight average molecular weight of about 800 to 20,000. Examples of alcoholic material may include glycerin, trimethylolethane, trimethylolpropane, pentaerythritol, etc. Examples of carboxylic acid material may include phthalic acid, phthalic anhydride, isophthalic acid, terephthalic acid, trimellitic acid, trimellitiic acid anhydride, gluaric acid, maleic acid, maleic anhydride, etc.

Examples of oil modifying material may include drying oils, such as linseed oil, safflower oil, tung oil, soybean oil, cotton seed oil, etc, and the fatty acids thereof.

As the water soluble epoxyester resins, those which are obtained by esterifying polyepoxide with a drying oil fatty acid (e.g. linseed oil fatty acid, safflower oil fatty acid, tall oil fatty acid, etc) in a well known manner and which possess an acid value of not more than 200, preferably 20 to 100, are suitable.

As the fatty acid modified water soluble acrylic resins, there are illustrated, for example, those which have a structure wherein an acrylic polymer obtained by radical polymerization is bound to unsaturated fatty acid and which preferably possess an acid value of about 20 to 100 and a weight average molecular weight of about 800 to about 20,000.

More specifically, they are high molecular weight polymers, wherein the main chain is an acrylic polymer obtained by radical polymerization and the side chain is a drying or semi-drying oil fatty acid residue capable of being cured by oxidation.

The process for preparing the high molecular weight polymer may be, for example, a process of previously preparing fatty acid modified vinyl monomer containing an unsaturated fatty acid residue and copolymerizing it with α, β—ethylenically unsaturated acid, α, β—ethylenically unsaturated monomer to thereby obtain fatty acid modified acrylic polymer. Another process, for example, may comprise synthesizing an acrylic polymer containing carboxyl groups and having a main chain of carbon to carbon bonds and subjecting this polymer to addition reaction with a fatty acid modified, epoxy group containing compound which is an adduct between an unsaturated fatty acid and diepoxide to thereby obtain a fatty acid modified acrylic polymer.

The solids content ratio (a)/(b), in the composition of this invention, is preferably within the range of 5/95 to 95/5, by weight.

The composition of this invention, has substantially improved properties, such as filming properties, luster and adhesiveness (which are poor with water dispersible resins) using only a comparatively small amount of oxidation curable water soluble resin. In addition, the invention composition has remarkably improved pigment dispersing properties. For example, (a)/(b) of not more than 95/5 is effective for improving luster, and (a)/(b) of not more than 80/20 is preferably for improving corrosion resistance. Where the content of water soluble resin is large, there results remarkably improved drying properties and solvent resistance, as compared with water soluble resin per se, although, inferior to the drying properties and solvent resistance of the emulsion itself.

To mix these, the vinyl type polymer emulsion may be gradually added to the water soluble resin under stirring, or the emulsion may be added thereto after diluting a processed solution of water soluble resin with water. In the case of manufacturing a paint containing additives such as pigment, the vinyl polymer emulsion may be added to a mixture previously obtained by dispersing a pigment in the water soluble resin.

The aqueous emulsion synthesized by the process of the present invention can provide an emulsion paint excellent in coating film properties as above described, based on the formulation of this invention, even when additivies such as driers (e.g. cobalt naphthenate, managanese naphthenate, zirconium naphthenate, etc) pigments (e.g. titanium white, calcium carbonate, silisic acid anhydride, etc) wetting agents, plasticizers, defoaming agents, rust inhibitors, thickening agents and water are added thereto.

When used as a paint, the composition of the present invention inhibits rust formation upon application to metals and provides a coating film having excellent film properties (excellent solvent resistance, luster, and adhesiveness). Also, it can be applied to metals such as steel, zinc-plated steel and aluminum; thus it is useful as a paint for vehicles, cars, agricultural machinery, outdoor structures (e.g. towers, bridges, etc) and for articles for household use.

The composition of this invention can find wide application as adhesives, binders for aqueous ink, coating materials, etc, other than paints utilizing water resistance, adhesiveness, excellent mechanical strength, etc.

This invention will now be more fully described with reference to examples, which examples are not to be construed in any limiting sense.

PREPARATION OF MALEINIZED DCPD POLYMER

Reference Example 1

Amourphous dicyclopentadiene polymers obtained by ring opening polymerization were all prepared according to a process disclosued in Japanese Patent (OPI) Ser. No. 92000/78.

500 g of a starting DCPD resin (intrinsic viscosity at 30° C. in xylene: 0.13) was dissolved in 500 g of tetralin, and 200 g of maleinized anhydride, 2.5 g of BHT, and 8 g of dimethylformamide were added thereto. After substantially replacing the atmosphere in the reaction vessel, the resultant mixture was heated to 190° C. to conduct addition reaction with maleic anhydride for 3 hours under stirring. The reaction solution was diluted with xylene, and poured into a large amount of methanol to precipitated a polymer. The thus obtained polymer was dried in vacuum at 60° C. Elemental analysis of the resultant polymer revealed that this resin had a theoretical acid value of 220.

Reference Example 2

500 g of maleinized DCPD resin obtained in Reference Example 1, was dispersed in 1700 g of deionized water. Then, 100 g of butyl cellosolve, 90 g of triethylamine, and 25 g of 25% aqueous ammonia were added thereto, and the resultant mixture was heated to 90° C. under stirring to obtain a homogeneous, transparent neutralized aqueous solution.

Then, 1450 g (300 g of maleinized DCPD polymer, 1020 g of water, 60 g of butyl cellosolve, 54 g of triethylamine, and 15 g of ammonia) of the above described neutralized aqueous solution was placed in a 3 liter, 4 necked flask equipped with a stirrer, a thermometer, a cooling tube, and a nitrogen introducing tube. Subsequently, 348 g of butyl methacrylate containing dissolved therein 5 g of cobalt naphthenate (containing 8% cobalt metal) and 20 go of lead naphthenate (containing 30% lead metal) as metal driers, 141 g of butyl arcylate, and 211 g of methyl methacrylate were added thereto, followed by several times replacing the atmosphere with nitrogen gas.

Then, 2.28 g of ammonium persulfate dissolved in 450 g of deionized water was added thereto, and the temperature of the system was raised to 50° C. under vigorous stirring. After polymerizing for 2 hours, the temperature of the system was further raised to 85° C. to conduct polymerization for 2 hours.

The resultant emulsion was a somewhat transparent, homogeneous solution. This emulsion contained 39 weight % solid components, and polymerization conversion calculation based on the solids content was 99.9%. Thus, polymerization was substantially completed.

Measurement of the emulsion under an electron microscope revealed that the emulsion particle size was on the average as fine as 0.04 M. and, pH of the emulsion was 8.9.

Reference Example 3

118 g of stearic acid, 60 g of glycidyl methacrylate, and 0.2 g of hydroquinone were placed in a four necked flask and reacted at 150° C. for 8 hours under stirring to obtain an addition reaction product.

40 g of this reaction product was dissolved in 100 g of butyl cellosolve and, after raising the temperature to 120° C., a mixture of 50 g of n-butyl methacrylate and 13 g of acrylic acid and 7 g of azobisisobutyronitrile were added thereto and polymerized for 8 hours, After completion of the reaction, butyl cellosolve was evaporated using an evaporator to obtain a polymer having an acid value of 90 and a solids content of 80% in a polymerization conversion of 99.1%.

12 g of 25% aqueous ammonia were added, to this reaction product to render it water soluble, and diluted with deionized water to obtain fatty acid modified acrylic resin aqueous solution having a solids content of 50%.

INVENTIVE COMPOSITION PREPARATION

EXAMPLES 1 and 2

A water soluble alkyd resin was gradually added, under stirring, to the emulsion solution obtained in Reference Example 2, in proportions given in Table 2, to obtain homogeneous mixtures or blends of aqueous compositions. Then, these compositions were respectively compounded with a titanium oxide series white pigment and a defoaming agent according to the formulation shown in Table 1 to obtain white paints. Various properties thereof are shown in Table 2.

TABLE 1

| | |
|---|---|
| (a) Paste Formulation: | |
| Aqueous composition | 50 parts |
| Titanium oxide series white pigment *1 | 80 parts |
| Water | 20 parts |
| Defoaming agen *2 | 1 part |
| (These were dispersed in a ball mill) | |
| Paste | 151 parts |
| (All parts herein are by weight unless indicated otherwise) | |
| (b) Paint formulation: | |
| Paste (a) described above | 151 parts |
| Aqueous composition | 110 to 155 parts |
| Water | Varying amounts |

*1 Tradename: Tipaque R930; made by Ishihara Sangyo Kaisha Ltd.
*2 Tradename: Additol XW-393; made by Hoechst.

TABLE 2

| | | Example 1 | Example 2 | Ref. Example 1 | Ref. Example 2 |
|---|---|---|---|---|---|
| Aqueous composition | (a) emulsion of Ref. Example 2 | 164 parts | 62 parts | 205 parts | 0 |
| | (b) Water soluble Alkyd Resin*3 | 32 parts | 112 parts | 0 | 160 parts |
| | Solids content ratio of (a)/(b) | 80:20 | 30:70 | 100:0 | 0:100 |
| Pigment dispersing properties as paint *4 | | good | good | fair | good |
| Coating film | Dry-to-the-touch time (min) | 15 | 20 | <10 | 35 |
| properties *5 | Primary Rust-forming properties | no | no | yes | no |
| | 60° mirror reflection | 85 | 90 | 80 | 96 |
| | Erichsen value (m/m) | >7 | >7 | 5 | >7 |
| | Water Resistance | good | good | good | bad |
| | Resistance against salt water spraying | good | good | bad | good |

Note:
*3 Tradename: Arolon 376; made by Nishoku Arrow Chemicals Co., Ltd.
*4 As the pigment, titanium oxide series white pigment was compounded in a proportion of 1:1; based on the solids contents of (a) and (b) of Table 1. The same applies hereinafter.
*5 Sample paints were coated on polished mild steel plates and, after drying for 7 days at ordinary temperature, tested according to JIS-K 5400.

As is clear from the foregoing, it is seen that the composition of the present invention remarkably removes the above-discussed defects of emulsions and water soluble resins while maintaining their merits.

EXAMPLES 3, 4 and 5

The water soluble acrylic resin of Reference Example 3 was gradually added, under stirring, to the emulsion solution of Reference Example 2, in proportions given in Table 3 to obtain homogeneous mixtures or blends of aqueous compositions.

Various properties of paints obtained by compounding these compositions according to the formulation shown in Table 1 are shown in Table 3.

TABLE 3

| | | Example 3 | Example 4 | Example 5 | Comparative Example 3 |
|---|---|---|---|---|---|
| Aqueous composition | (a) emulsion of ref. Ex. 2 | 185 parts | 164 parts | 62 parts | 0 |
| | (b) water-soluble acryl | 16 parts | 32 parts | 112 parts | 160 parts |
| | solids contents ratio (a)/(b) | 90/10 | 80/20 | 30/70 | 0/100 |
| Pigment dispersing properties as paint | | good | good | good | good |
| Coating film properties | Dry to touch time (min) | 10 | 15 | 25 | 40 |
| | Primary Rust-forming properties | no | no | no | no |
| | 60° mirror reflection | 85 | 87 | 92 | 95 |
| | Erichsen value (m/m) | 7 | 7 | 7 | 7 |
| | Water Resistance | good | good | good | bad |
| | Resistance almost Against salt water spraying | good good | good good | good good | |

EXAMPLES 6, 7 and 8

Water soluble epoxyester resin was gradually added, under stirring, to the emulsion solution of Reference Example 2, in proportion given in Table 4 to obtain homogeneous mixtures or blends aqueous compositions.

Various properties of paints obtained by compounding these compositions according to the formulation shown in Table 1, are shown in Table 4.

TABLE 4

| | | Example 6 | Example 7 | Example 8 | Reference example 4 |
|---|---|---|---|---|---|
| aqueous composition | (a) Emulsion of Ref. Ex. 2 | 164 parts | 103 parts | 62 parts | 0 |
| | (b) Water soluble epoxyester resin *6 | 32 parts | 80 parts | 112 parts | 160 parts |
| | Solids content ratio (a)/(b) | 80/20 | 50/50 | 30/70 | 0/100 |
| Pigment dispersing properties as paint | | good | good | good | good |
| coating film properties | Dry to touch time (min) | 10 | 25 | 25 | 40 |
| | Primary Rust forming properties | no | no | no | no |
| | 60° mirror reflection | 85 | 87 | 87 | 90 |
| | Erichsen value (m/m) | 7 | 7 | 7 | 7 |
| | water resistance | good | good | good | bad |
| | Resistance against salt water spraying | good | good | good | good |

The foregoing description is illustrative of the principles of the invention. Numerous other extensions and modifications thereof would be apparent to the persons skilled in the art. All such extensions and modifications are to be considered to be within the spirit and scope of the invention.

I claim:

1. A composition comprising a homogeneous mixture of
   (a) a vinyl polymer obtained by polymerizing a vinyl monomer or monomers in the presence of a neutralized, water soluble product of an adduct between a substantially amorphous polymer obtained by ring opening polymerization of dicyclopentadiene represented by the following chemical structural formula:

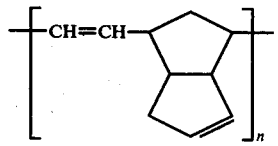

and maleic acid or maleic anhydride; and
   (b) an oxidation-curable water soluble resin, with a proportion of (a) to (b) being within the range of 5:95 to 95:5, in terms of solid content.

2. The composition of claim 1, wherein said oxidation curable water soluble resin is a water soluble resin selected from the group consisting of water soluble alkyd resins, water soluble epoxyester resins, and fatty acid modified water soluble acrylic resins.

3. The composition of claim 1, wherein said oxidation curable water soluble resin is a water soluble resin having an acid value of about 20 to about 100 and a weight average molecular weight of about 800 to about 20,000.

4. The composition of claim 1, wherein said vinyl monomer is one, two or three monomers selected from the group consisting of aromatic vinyl monomers, acrylic esters and methacrylic esters.

5. The compositions of claim 1, wherein said proportion of component (a) and component (b) is not more than 80/20.

6. The composition of claim 1, wherein said water soluble product has a molecular weight of between 500 to 50,000.

7. The composition of claim 6, wherein said water soluble product has a molecular weight of between 1,000 to 10,000.

8. The composition of claim 1, wherein said water soluble product has an acid value of about 30 to about 500.

9. The composition of claim 8, wherein said water soluble product has an acid value of 50 to 300.

* * * * *